United States Patent [19]

Yanagawa

[11] Patent Number: 5,437,097
[45] Date of Patent: Aug. 1, 1995

[54] METHOD AND APPARATUS FOR MANUFACTURING A CAM SHAFT

[75] Inventor: Hiroshi Yanagawa, Hiroshima, Japan

[73] Assignees: Matsumoto Heavy Industry Co. Ltd., Hiroshima; Isuzu Motors Limited, Tokyo, both of Japan

[21] Appl. No.: 70,082

[22] Filed: Jun. 1, 1993

[51] Int. Cl.⁶ .................................................. B23P 15/00
[52] U.S. Cl. .................................. 29/888.1; 29/888.08; 29/523
[58] Field of Search ................. 29/888.1, 888.08, 523, 29/522.1, 281.1; 74/567

[56] References Cited

U.S. PATENT DOCUMENTS

| Re. 33,888 | 4/1992 | Hartnett et al. | 29/888.1 |
|---|---|---|---|
| 3,979,811 | 9/1976 | Kammeraad | 29/888.1 |
| 4,438,555 | 3/1984 | Tsumuki et al. | 29/888.1 |
| 4,781,075 | 11/1988 | Yanaji et al. | 29/888.1 |
| 4,809,562 | 3/1989 | Bendoraitas et al. | 29/888.1 |
| 4,835,832 | 6/1989 | Arnold et al. | 29/888.1 |
| 4,847,963 | 7/1989 | Bendoraitas et al. | 29/888.1 |
| 5,157,832 | 10/1992 | Hughes | 29/888.1 |
| 5,195,229 | 3/1993 | Hughes | 29/888.1 |
| 5,220,727 | 6/1993 | Hochstein | 29/888.1 |

FOREIGN PATENT DOCUMENTS

| 58-113805 | 8/1983 | Japan . | |
|---|---|---|---|
| 0070103 | 4/1985 | Japan | 29/888.1 |
| 262333 | 12/1990 | Japan . | |

Primary Examiner—Irene Cuda
Attorney, Agent, or Firm—Foley & Lardner

[57] ABSTRACT

A method for manufacturing a cam shaft including the steps of preparing cam pieces provided with shaft holes and a tubular shaft member having a hollow portion, forming a plurality of grooves extending in the axial direction of the shaft hole at predetermined positions on the inner circumferential surfaces of the shaft holes of the cam pieces, fitting the shaft member onto the shaft holes of the cam pieces after arranging the cam pieces at the predetermined portions of a support tool and thereafter inserting under pressure a tube expanding tool provided with bulged portions corresponding to the grooves into the hollow portion of the shaft member to bulge and deform the shaft member in the radial direction so that the grooves and bulged portions are confronted with each other, thus to bond the cam pieces and the shaft member together.

3 Claims, 24 Drawing Sheets

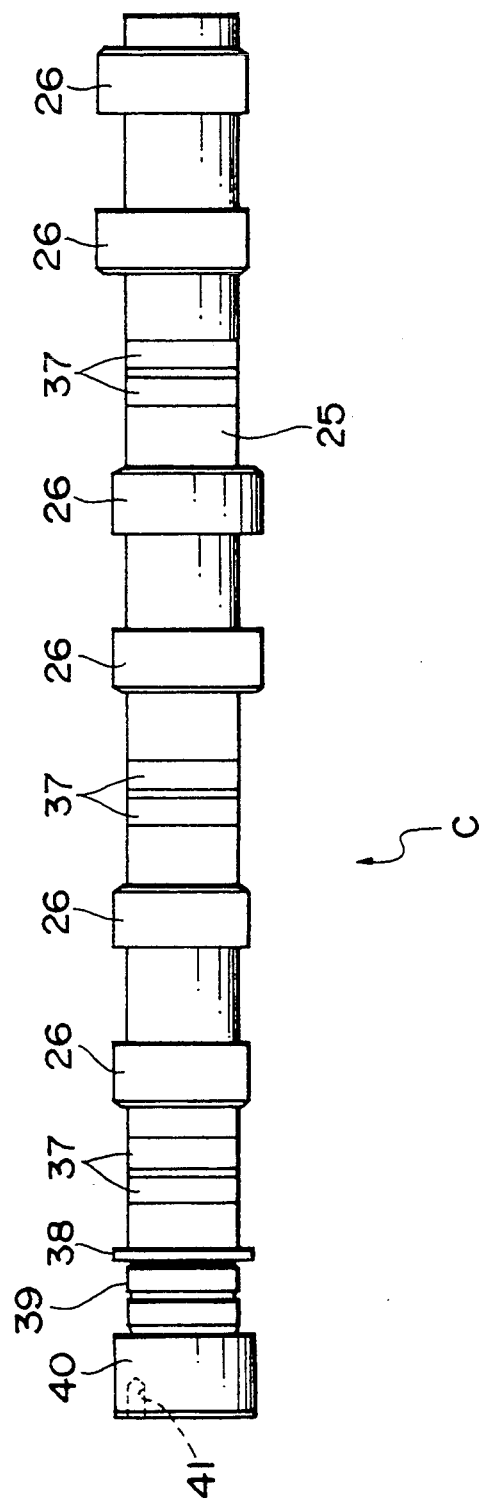

METHOD AND APPARATUS FOR MANUFACTURING A CAM SHAFT

BACKGROUND OF THE INVENTION

1. Field of the Invention

The present invention relates to a method for manufacturing a cam shaft which is arranged to bulge and deform a tubular shaft member having a hollow portion in the radial direction after fitting thereon cam pieces having shaft holes so as to joint said shaft member with the cam pieces.

2. Description of the Prior Art

Recently, in an automobile engine, the number of cam shafts is in the increasing trend due to adoption of DOHC mechanism, V-shaped arrangement of cylinders, etc., but accompanying this trend, there is such a problem that the valve operating system of the engine becomes large-sized and heavy-weighted. Therefore, methods for the weight reduction of the valve operating system by making the shaft hollow have been proposed. For example, a method for forming a cam shaft which is arranged to bulge and deform a hollow tubular shaft member in the radial direction after fitting thereon cam pieces having shaft holes a little larger than the outer diameter of said shaft member so as to press the outer circumferential surface of the shaft member into contact with the inner circumferential surface of each of said cam pieces, thus to joint said shaft member with said cam pieces has been proposed.

Concretely, there has been proposed a manufacturing method for a cam shaft (the so-called bulge processing) which is arranged to bulge and deform in the radial direction a hollow tubular shaft member after fitting cam pieces thereon by feeding high pressure fluid into the hollow portion thereof, thus to joint the shaft member with the cam pieces (for example, Japanese Patent Application Publication Tokukohei No. 2-62333).

In addition, there has been also proposed a manufacturing method for a cam shaft which is arranged to insert, after fitting cam pieces on a tubular shaft member, a steel ball or an expanding member having a diameter a little larger than the diameter of the hollow portion of said shaft member into the hollow portion of the shaft member, thus to joint the shaft member with the cam pieces (for example, Japanese Utility Model Laid-Open Publication Jitsukaisho No.58-113805).

However, in these conventional manufacturing methods for the cam shaft, there has been such a problem that the bonding force between the shaft member and the cam pieces are comparatively weak and the durability of the cam shaft is low. Furthermore, there has been such a problem that the positioning of the cam pieces is difficult.

The present invention has been developed to solve such conventional problems as described above, and an essential object of the present invention is to provide a cam shaft manufacturing method which is capable of strongly bonding the shaft member and the cam pieces together and easily effecting the positioning of the cam pieces.

SUMMARY OF THE INVENTION

In order to achieve the above-described object, according to the first aspect of the present invention, there is provided a method for manufacturing a cam shaft comprising steps of: preparing cam pieces provided with shaft holes and a tubular shaft member having a hollow portion; forming a plurality of grooves extending in the axial direction of said shaft hole at the predetermined positions on the inner circumferential surfaces of said shaft holes of the cam pieces; fitting the shaft member onto the shaft holes of said cam pieces after arranging said cam pieces at the predetermined portions of a support tool; and thereafter inserting under pressure a tube expanding tool provided with bulged portions corresponding to said grooves into the hollow portion of the shaft member to bulge and deform the shaft member in the radial direction so that said grooves and bulged portions are confronted with each other, thus to bond the cam pieces and the shaft member together.

Furthermore, according to the second aspect of the present invention, there is provided a method for manufacturing a cam shaft as claimed in claim 1 further comprises steps of: preparing a support tool provided with circular holes having a diameter larger than the largest diametral length of the cam shaft member and arranging positioning pins at the predetermined positions around the circular holes of said support tool; arranging cam pieces provided with pin accommodating holes capable of engaging with said positioning pins on the support tool so that said pin accommodating holes are outwardly fitted onto said positioning pins; and effecting the positioning of the cam pieces by fitting the shaft member onto said shaft holes and circular holes.

In addition, according to the third aspect of the present invention, there is provided a method for manufacturing a cam shaft comprises steps of: preparing cam pieces provided with shaft holes and a tubular shaft member having a hollow portion; forming a plurality of grooves extending in the axial direction of shaft holes at the predetermined positions on the inner circumferential surfaces of the shaft holes of the cam pieces and providing bulged portions of a shape capable of engaging with said grooves; fitting the shaft member onto the shaft holes of cam pieces so that said grooves and bulged portions are engaged with each other after arranging said cam pieces on the predetermined portions of the support tool; and bulging and deforming the shaft member in the radial direction by inserting under pressure a tube expanding tool provided with a tube expanding portion having a diameter larger than that of the hollow portion into the hollow portion of the shaft member, thus to bond the cam pieces and the shaft member together.

Furthermore, according to the fourth aspect of the present invention, there is provided a method for manufacturing a cam shaft as claimed in claim 3 further comprises steps of: preparing a support tool provided with circular holes of a diameter larger than the largest diametral length of the shaft member and arranging positioning pins at the predetermined positions around the circular holes of said support tool; arranging cam pieces provided with pin accommodating holes capable of engaging with said positioning pins on the support tool so that said pin accommodating holes are fitted outwardly onto said positioning pins; and effecting the positioning of cam pieces by thereafter fitting the shaft member onto said shaft holes and circular holes.

According to the first aspect of the present invention, by the insertion of the tube expanding tool under pressure, the outer circumferential portions of the shaft member which engage with the bulged portions of the tube expanding tool are bulged and deformed to a great extent in the radial direction by said bulged portions. And, said greatly bulged and deformed portions of the shaft member intrude into the groove formed on the inner circumferential surfaces of cam pieces. Therefore, the bonding force between the shaft member and cam pieces becomes very strong and the durability of the cam shaft is increased.

According to the second aspect of the present invention, basically the same operation and effect as in the first aspect of the present invention can be obtained. Furthermore, since the positioning of cam pieces is effected by the pin accommodating holes formed on the cam pieces and the positioning pins when arranging the cam pieces, when the shaft member is fitted onto the shaft holes and circular holes, cam pieces are spontaneously positioned correctly on the predetermined positions. Therefore, the arrangement of the cam pieces becomes easy, and the dimensional accuracy of the cam shaft is elevated. Furthermore, the cam shaft is reduced in weight by the amount corresponding to said pin accommodating holes.

Further according to the third aspect of the present invention, by the insertion of the tube expanding tool under pressure, the outer circumferential surface of the shaft member is brought into contact under pressure with the inner circumferential surfaces of cam pieces so as for the shaft member to be bonded with cam pieces. At this time, since the bulged portions of the shaft member are fitted into the grooves of cam pieces, the bonding force between the shaft member and cam piece is elevated sufficiently and the durability of the cam shaft is increased to a great extent.

According to the fourth aspect of the present invention, basically, the same operation and effect as in the third aspect of the present invention. Furthermore, since the positioning of cam pieces is conducted by the pin accommodating holes and positioning pins in arranging cam pieces, when the shaft member is fitted onto the shaft holes and circular holes, cam pieces are spontaneously arranged correctly at the predetermined positions. Therefore, the arranging or positioning of cam pieces becomes very easy and the dimensional accuracy of the cam shaft is elevated. Furthermore, the cam shaft is reduced in weight by the amount corresponding to said pin accommodating holes.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 12 is an explanatory side view of a cam shaft according to the first embodiment;

DETAILED DESCRIPTION OF THE PREFERRED EMBODIMENTS

<The first embodiment>

Hereinbelow, as the first embodiment of the present invention, a cam shaft manufacturing method for a suction valve cam of a DOHC V-type six cylinder engine (V6 engine) will be concretely described with reference to the flow chart shown in FIG. 1.

Figure 1:
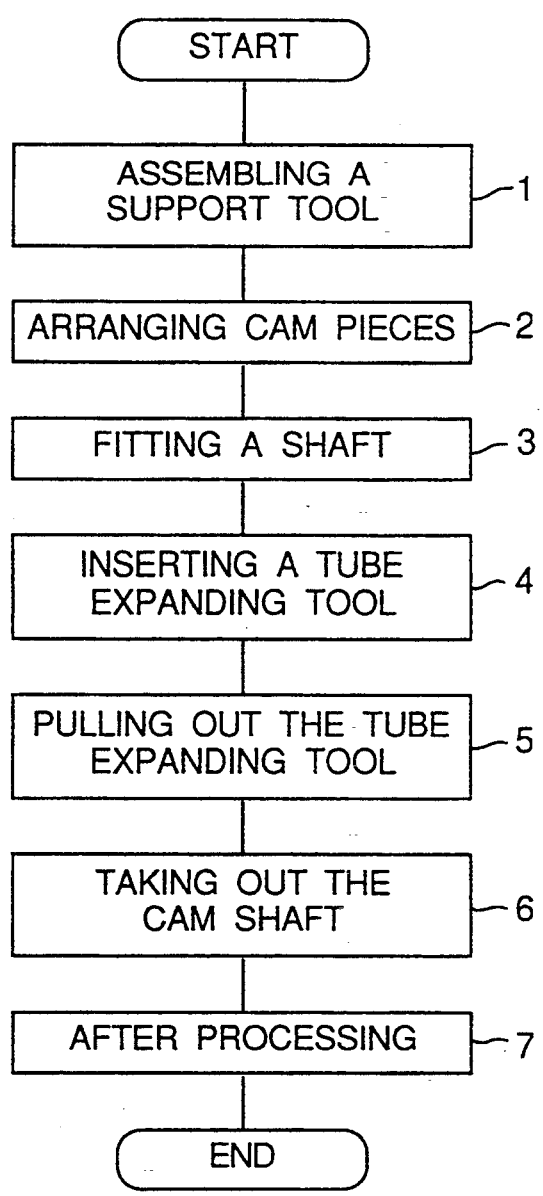
FIG. 1 is a flow chart showing a cam shaft manufacturing method according to the first embodiment of the present invention.

As shown in FIG. 1, in Step #1, a support tool for supporting a cam shaft and the components thereof in the manufacture of the cam shaft is assembled.

Figure 2A:
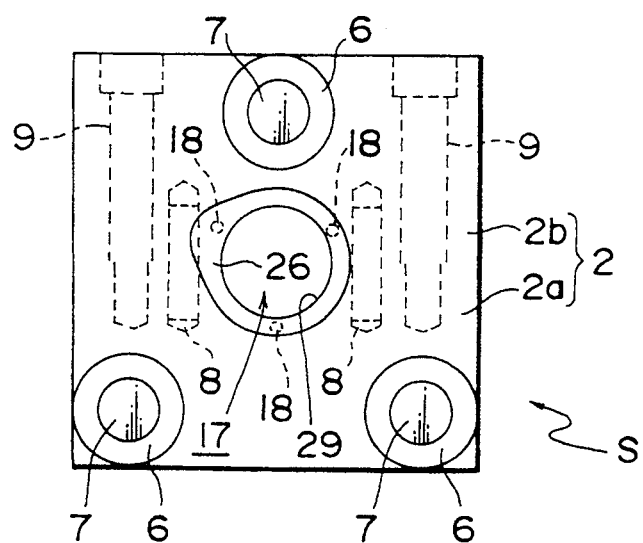
FIGS. 2(a) and 2(b) are respectively explanatory plan and elevation views of a support tool according to the first embodiment of the present invention.
Figure 2B:
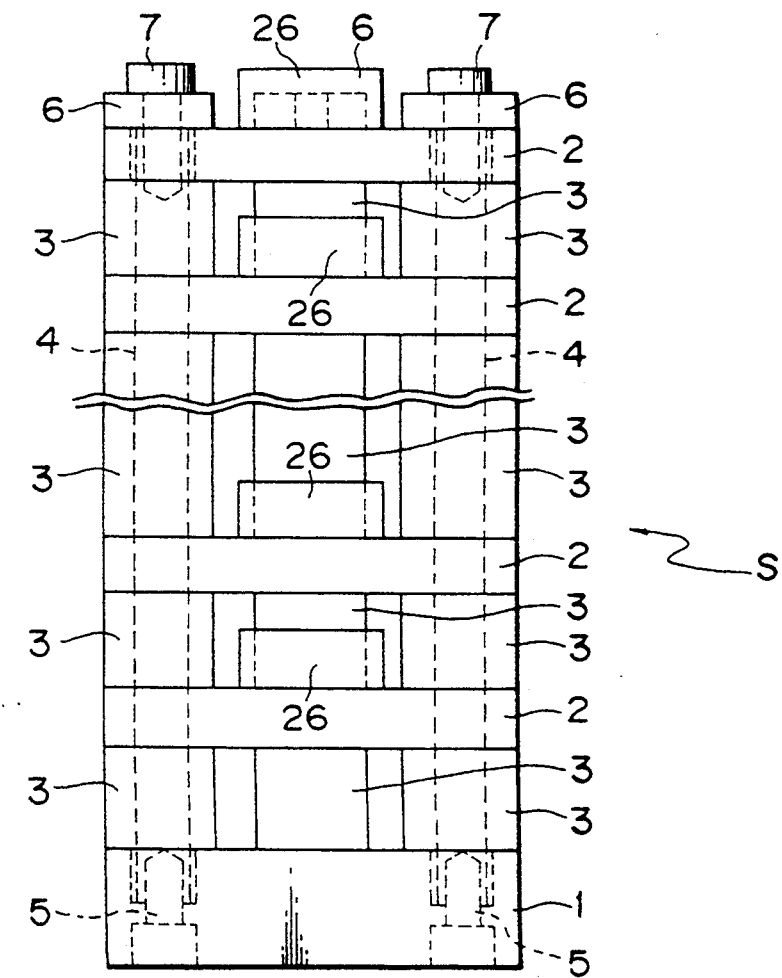

As shown in FIGS. 2(a) and 2(b), the support tool S is constructed by a base plate 1, a plurality of upper plates 2 arranged above said base plate 1 at predetermined spacings, a plurality of cylindrical between-plate members 3 arranged for controlling the spacings between respective plates 1, 2, and a plurality of connecting rods 4 for connecting and fastening respective plates 1, 2 and between-plate members 3 in the arrangement direction. Here, the lower end portions of the connecting rod 4 are fastened to the base plate 1 with connecting bolts 5. Furthermore, on the upper end portions of connecting rods 4, tightening bolts 7 are screwed in through washers 6 arranged on the uppermost upper plate 2, and by the tightening forces of respective connecting rods 4 and tightening bolts 7, respective upper plates 2 and respective cylindrical between-plate members 3 are fixed to each other. As will be described later, the base plate 1 and respective upper plates 2 are respectively composed of two half-plates, and confronting half-plates are connected and integrated by using connecting pins 8 and tightening screws 9.

Hereinbelow, respective members constituting the support tool S will be described.

Figure 3A:
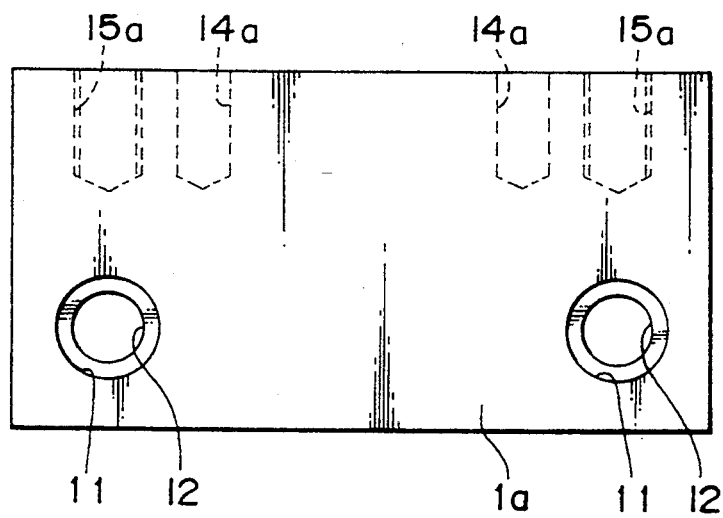
FIGS. 3(a) and 3(b) are respectively explanatory plan and elevation views of a first half-plate constituting a base plate.
Figure 3B:
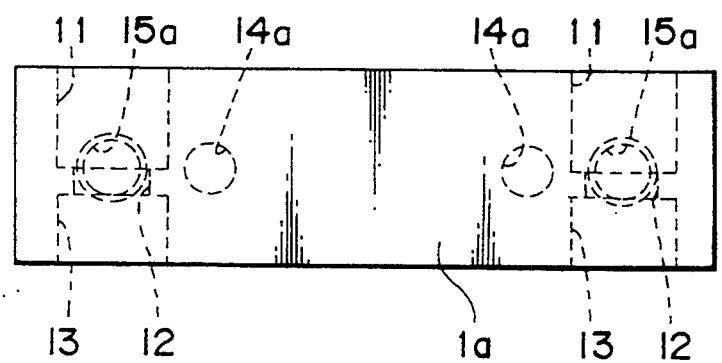

As shown in FIGS. 3(a) and 3(b), on a first half-plate 1a of the base plate 1, upper holes 11, intermediate holes 12 of a smaller diameter than the upper holes 11 and lower holes 13 of the same diameter as the upper holes 11 are provided in series with respective axial lines being directed in the thickness direction of the first half-plate 1a. Here, upper holes 11 are opened to the upper surface of the first half-plate 1a and lower holes 13 are opened to the lower surface of the first half-plate 1a, and intermediate holes 12 are communicated to upper holes 11 and lower holes 13. It is to be noted here the first half-plate 1a is provided with two sets of such a series of holes 11 to 13.

Here, in assembling the support tool S, the lower end portion of the connecting rod 4 is inserted into the upper hole 11, thereafter from the lower hole 13, the connecting bolt 5 is inserted into the screw hole 23 (refer to FIG. 8) of the connecting rod 4 through the intermediate hole 13, thus to connect the first half-plate 1a and the connecting rod 4 to each other (refer to FIG. 2).

Furthermore, the first half-plate 1a is provided, on the contact surface with a second half-plate 1b (refer to FIG. 4), with connecting pin insertion holes 14a and screw holes 15a the axial lines of which are respectively directed in the direction normal to said contact surface, and the connecting pin insertion holes 14a and the screw holes 15a are respectively opened to the contact surface with the second half-plate 1b. On the first half-plate 1a, two sets of said connecting pin insertion holes 14a and screw holes 15a are provided.

Figure 4A:
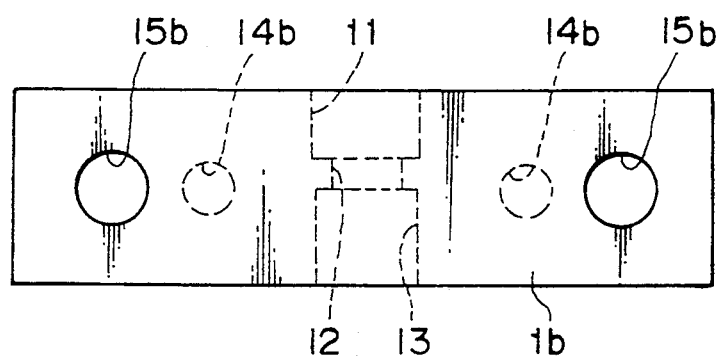
FIGS. 4(a) and 4(b) are respectively explanatory elevation and plan views of a second half plate constituting a base plate.
Figure 4B:
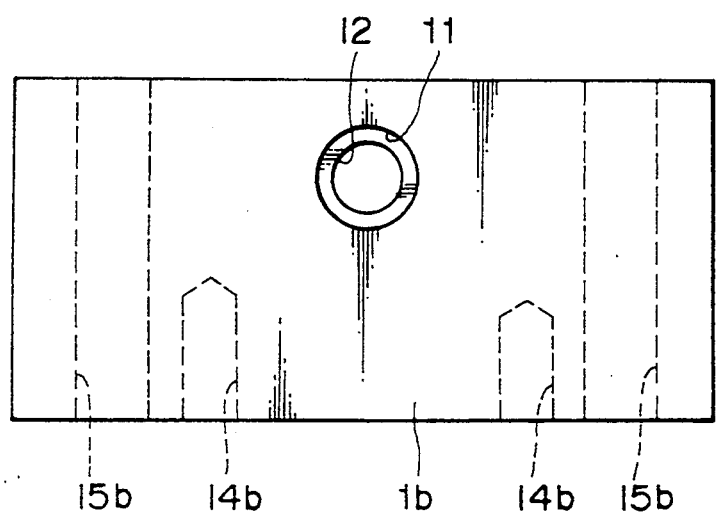

As shown in FIGS. 4(a), 4(b), the second half-plate 1b of the base plate 1 is also provided with an upper hole 11, an intermediate hole 12 and a lower hole 13, as in the first half-plate 1a (only one set of holes). Furthermore, on the second half-plate 1b, connecting pin insertion holes 14b are provided on the positions corresponding to the connecting pin insertion holes 14a of the first half-plate 1a, and holes 15b piercing the second half-plate 1b in the spread direction are provided at the positions corresponding to the screw holes 15a of the first half-plate 1a.

Here, in assembling the support tool S, the half portions of the connecting pins 8 are first inserted into the connecting pin insertion holes 14a, and next, the exposed portions of the connecting pins 8 (portions not inserted into the connecting pin insertion holes 14a) are inserted into the connecting pin insertion holes 14b, thus to effect the positioning of the first and second half-plates. Thereafter, tightening screws 9 are screwed into the screw holes 15a through the holes 15b from the side of the second half-plate 1b, thus to connect and integrate the first and second half-plates 1a and 1b (refer to FIG. 2).

Figure 5A:
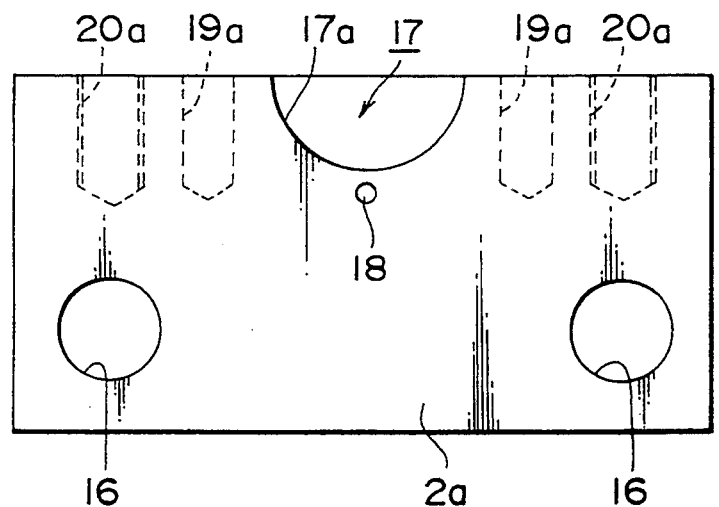
FIGS. 5(a) and 5(b) are respectively explanatory plan and elevation views of a first half-plate constituting an upper plate.
Figure 5B:
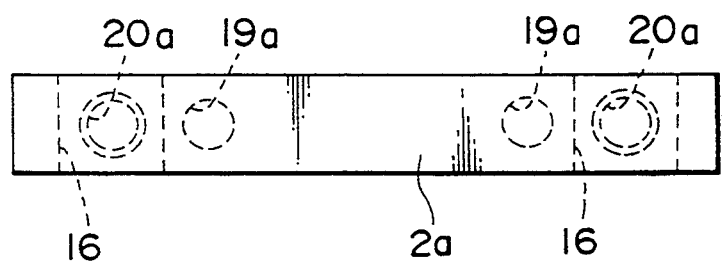

As shown in FIGS. 5(a) and 5(b), on a first half-pate 2a of an upper plate 2, two holes 16 for passing the connecting rods 4 are provided, and facing the contact surface of a second half-plate 2b (refer to FIG. 6), a semi-circular cut-off portion 17a is provided with a pin hole 18 for inserting a positioning pin (not shown) positioning a cam piece 26 (refer to FIG. 12) being provided in the vicinity of the cut-off portion 17a.

Further on the first half-plate 2a, connecting pin insertion holes 19a and screw holes 20a are provided with the respective axial lines being directed in the direction normal to the contact surface with the second half-plate 2b. These connecting pin insertion holes 19a and screw holes 20a are respectively opened to the contact surface with the second half-plate 2b. It is to be noted here that two sets of connecting pin insertion holes 19a and screw holes 20a are provided on the first half-plate 2a.

Figure 6A:
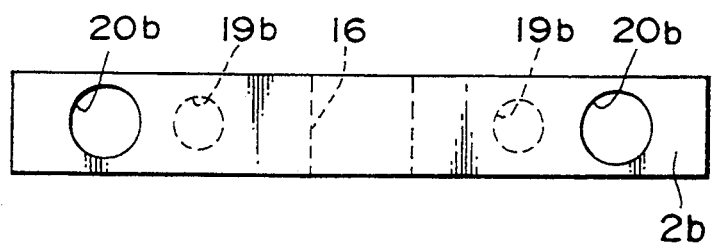
FIGS. 6 (a) and 6 (b) are respectively explanatory elevation and plan views of a second half-plate constituting an upper plate.
Figure 6B:
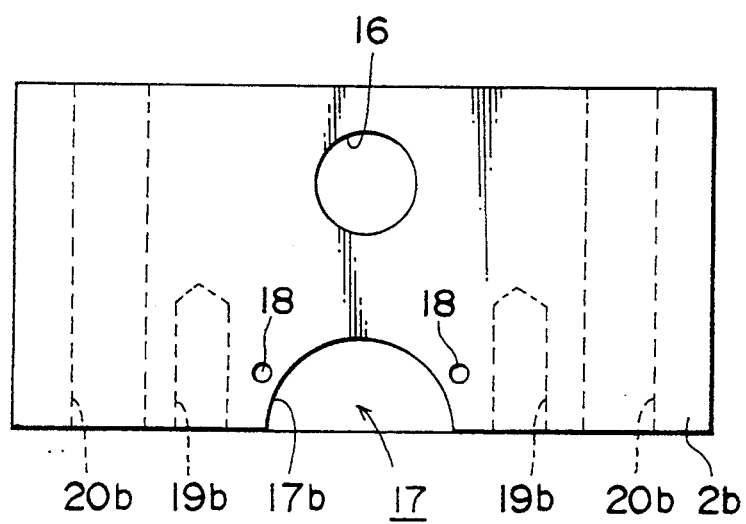

As shown in FIGS. 6(a) and 6(b), a second-half plate 2b is provided, as in the first half-plate 2a, with a hole 16, a cut-off portion 17b and two pin holes 18. Furthermore, connecting pin insertion holes 19b are provided on the positions corresponding to the connecting pin insertion holes 19a of the first half-plate 2a, and on the positions corresponding to the screw holes 20a, holes 20b piercing the second half-plate 2b in the spread direction are provided. The assembling method of the first and second half-plates 2a and 2b in assembling the support tool S is the same as in the assembly of the base plate 1.

When an upper plate 2 has been assembled, a circular hole 17 is formed by both cut-off portions 17a and 17b with three pin holes 18 being located around this circular hole 17. The circular hole 17 is set a little larger in diameter than the largest diametral length of a shaft member 25 (refer to FIG. 12) to be described later so that the shaft member 25 can pass through this circular hole 17. In the present embodiment, since the engine is of the V6 type, three pin holes 18 are arranged around the circular hole 17 at the positions 120° apart from each other.

It is to be noted here that the number and positions of these pin holes 18 depend on the engine type, and for example, in the case of a cam shaft of the four cylinder engine, four pin holes are provided at the positions 90° apart from each other.

Figure 7A:
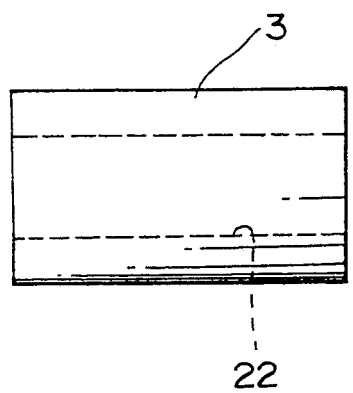
FIGS. 7(a) and 7(b) are respectively side and axial views of a between-plate member.
Figure 7B:
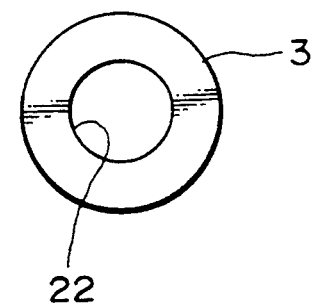

As shown in FIGS. 7(a) and 7(b), a cylindrical between-plate member 3 having a through hole 22 for passing the connecting rod 4 therethrough is provided to regulate the distance between the base plate 1 and the lowest upper plate 2 or the distances between adjacent upper plates 2, namely, to regulate the arrangement positions in the axial direction of cam pieces 26 (refer to FIG. 12). Therefore, the axial lengths of respective between-plate members 3 differ depending upon the positions of the plates between which they are arranged.

Figure 8:
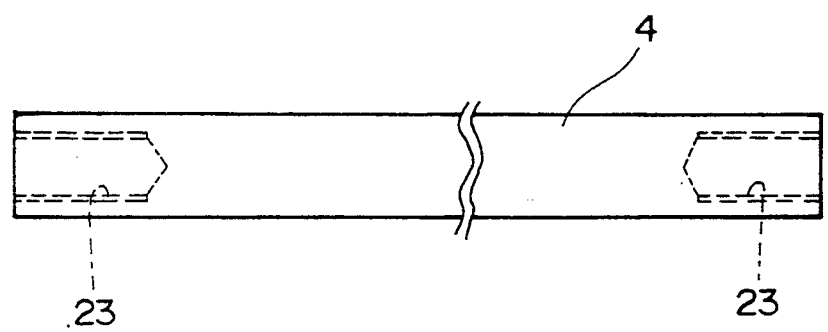
FIG. 8 is an explanatory side view of a connecting member.

As shown in FIG. 8, on both ends of the connecting rod 4, there are provided screw holes 23 for screwing a connecting bolt 5 or a tightening bolt 7 (refer to FIG. 2).

The assembling of the support tool S is conducted, for example, in such a procedure that the base plate 1 and upper plates 2 are first assembled by connecting corresponding half-plates by using connecting pins 8 and tightening screws 9, next, connecting rods 4 are installed on the base plate 1 by using connecting bolts 5, thereafter, between-plate members 3 and upper plates 2 are piled up on the base plate 1 in a predetermined order, and tightening bolts 7 are screwed into the screw holes 23 on the upper ends of the connecting rods 4 through washers 6.

In Step #2, in a predetermined position on the upper surface of each upper plate 2, a cam piece is arranged.

Figure 9A:
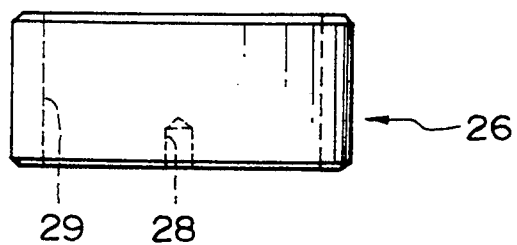
FIGS. 9(a) and 9(b) are respectively side and axial views of a cam piece.
Figure 9B:
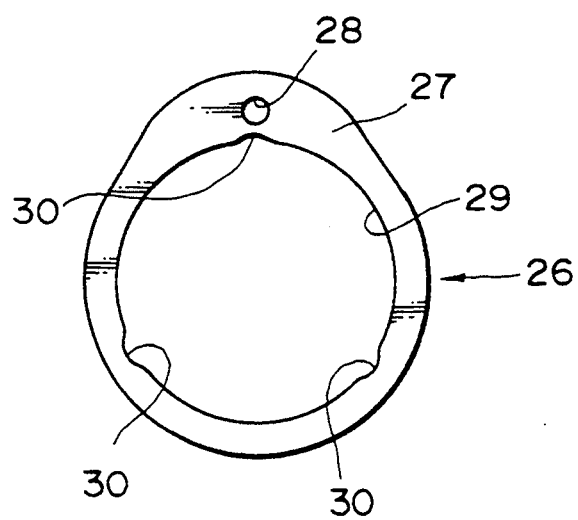

As shown in FIGS. 9(a) and 9(b), the cam piece 26 is formed with a ferrous material (for example, steel) having a predetermined hardness, and on the central portion of the cam nose portion 27, a positioning pin hole 28 for accommodating a positioning pin (not shown) is provided. Furthermore, on the cam piece 26, a shaft hole 29 piercing therethrough in the thickness direction is provided, with three grooves 30 extending in the thickness direction being provided on the inner circumferential surface of the cam piece 26, that is, on the surface of the shaft hole 29. One of these grooves 30 is positioned at the position corresponding to the most bulged portion of the cam nose 27 (in the vicinity of the pin hole 28) viewed in the circumferential direction of the shaft hole 29, and these three grooves 30 are arranged on the positions 120° apart from each other in the circumferential direction of the shaft hole 29.

The number and positions of these grooves 30 are not limited to the above-described but needless to say, various settings may be possible.

Concretely, before arranging the cam piece 26, a positioning pin is inserted into a predetermined one pin hole of three pin holes 18 of respective upper plates 2. In the first embodiment, on the first and second upper plates 2 from above, positioning pins are inserted into the pin holes 18 (for convenience, referred to as the first pin insertion position) arranged at the same positions viewed in the circumferential direction of the shaft hole 17, and on the third and fourth upper plates 2, positioning pins are inserted into the pin holes 18 arranged at the positions (for convenience, referred to as the second pin insertion positions) 120° arc angle apart from the first pin insertion positions, and on the fifth and sixth upper plates 2, positioning pins are inserted into the pin holes 18 arranged at the positions further 120° arc angle apart from the second pin insertion positions.

It is to be noted here that in the case of a different engine type, for example, in the case of the four cylinder engine, of course, the number of pin holes and the positions thereof, and the positioning pin insertion positions are varied in accordance therewith.

Thus, cam pieces 26 are arranged on respective upper plates 2 with pin holes 28 being fitted outwardly onto said positioning pins.

FIGS. 2(a) and 2(b) show the state wherein respective cam pieces 26 are thus arranged on the corresponding upper plates 2, respectively.

Figure 10A:
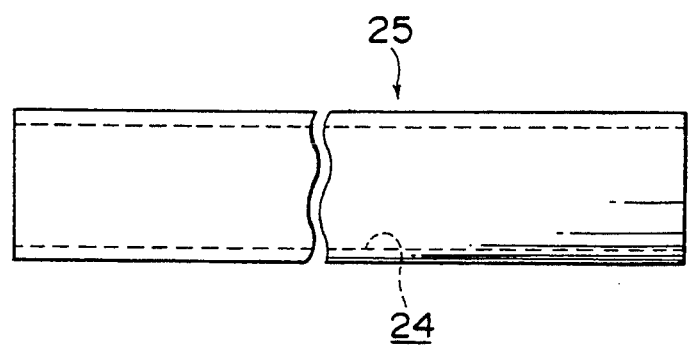
FIGS. 10(a) and 10(b) are respectively explanatory side and axial views of a shaft member.
Figure 10B:
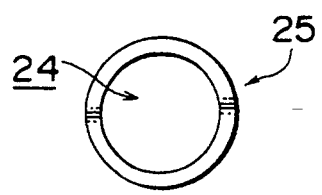

In step #3, as shown in FIG. 10, a tubular shaft member 25 having a hollow portion 24 is fitted onto the shaft holes 29 of the cam pieces 26 and circular holes 17 arranged at the predetermined positions. Since respective cam pieces 26 are positioned by the positioning pins, when the shaft member 25 is fitted onto the shaft holes 29 and circular holes 17, respective cam pieces 26 are spontaneously correctly arranged on the predetermined positions with respect to the circumferential direction thereof. Namely, the positioning of cam pieces 26 becomes very easy.

It is to be noted that since a pin accommodating hole 28 is formed on the cam piece 26, the cam piece 26 become lighter in weight by that hole portion, resulting in the weight reduction of the cam shaft C.

In Step #4, a tube expanding tool is inserted under pressure into the hollow portion 24 of the shaft member 25, thus to bulge and deform the shaft member 25 outward in the radial direction.

Figure 11A:
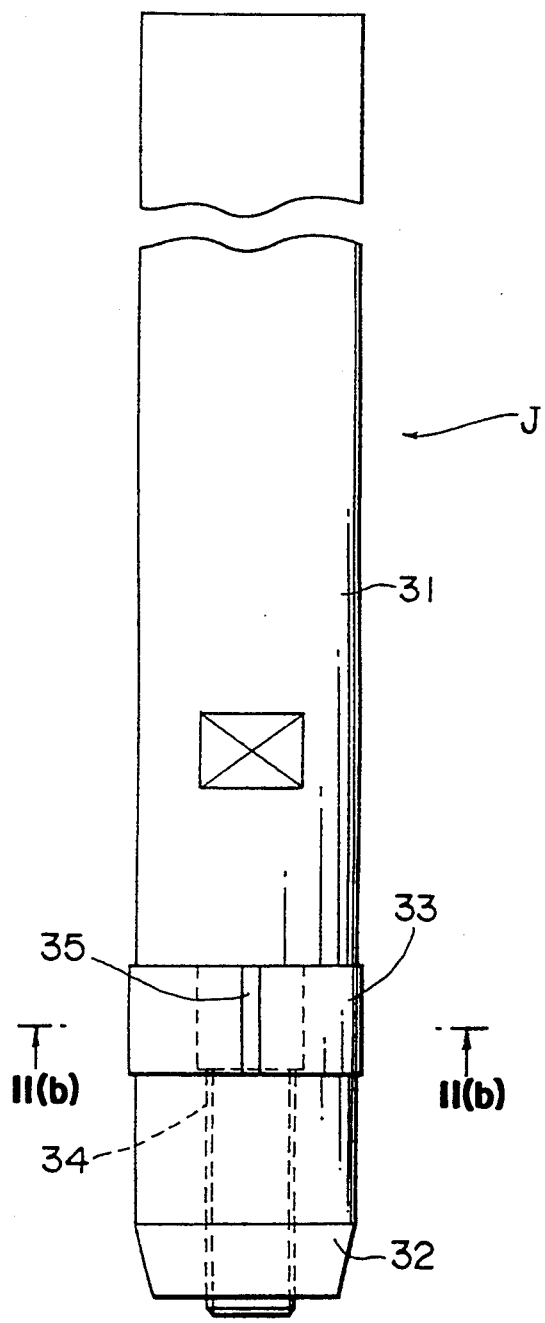
FIG. 11(a) is an explanatory side view of a tube expanding tool and FIG. 11(b) is a sectional view along line A—A.
Figure 11B:
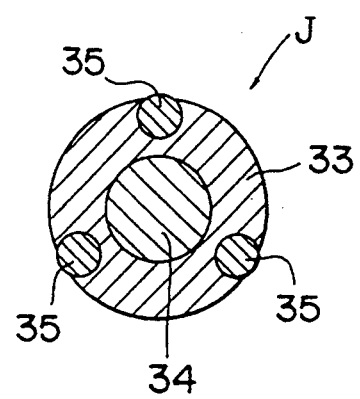

As shown in FIGS. 11(a) and 11(b), the tube expanding tool J is constructed substantially by a main body portion 31 of an approximately circular column shape, a guide portion 32 of an approximately annular shape having a tapered tip end portion and a tube expanding portion 33 of an approximately annular shape arranged between said main body portion 31 and guide portion 32. Respective portions 31 to 33 of the tube expanding tool J are formed by ferrous materials (for example, S55C) having predetermined hardness (for example, more than HRC 50). Here, the tube expanding portion 33 are fitted on a projecting portion 34 projectingly provided on the tip end portion of the main body portion 31 and the guide portion 32 is screwed in onto the threaded portion of the projecting portion 34.

In the vicinity of the outer circumference of the tube expanding portion 33, there are provided three cylindrical pins 35, which are arranged so as to project by a predetermined length (for example, 0.3 to 0.5 mm) in the radial direction of the main body of the tube expanding portion 33. Here, three pins 35 are respectively arranged at the positions 120° arc angle apart from each other in the circumferential direction of the tube expanding portion 33.

The tube expanding tool J is inserted under a predetermined pressing force (for example, 3 to 4.5 tons) into the hollow portion 24 of the shaft member 25, with the projecting portions of respective pins 35 of the tube expanding portion 33 being confronted with the grooves 30 of the shaft hole 29 of the cam piece 26, namely, with respective pins 35 being arranged at the same positions as the corresponding grooves 30 viewed in the circumferential direction. As described above, since three pins 35 are arranged at the positions respectively deviated 120° in the circumferential direction and the grooves 30 are also arranged at the positions respectively 120° deviated in the circumferential direction, the pin 35 and the groove 30 can be easily confronted with each other by suitably turning the tube expanding tool J around its axial line.

Here, the shaft member 25 is bulged and deformed outward in the radial direction by the tube expanding tool J, so that the outer circumferential surface of the shaft member 25 is press-bonded onto the inner circumference of the cam piece 26, whereby the shaft member 25 and respective cam pieces 26 are firmly bonded together.

Figure 15:
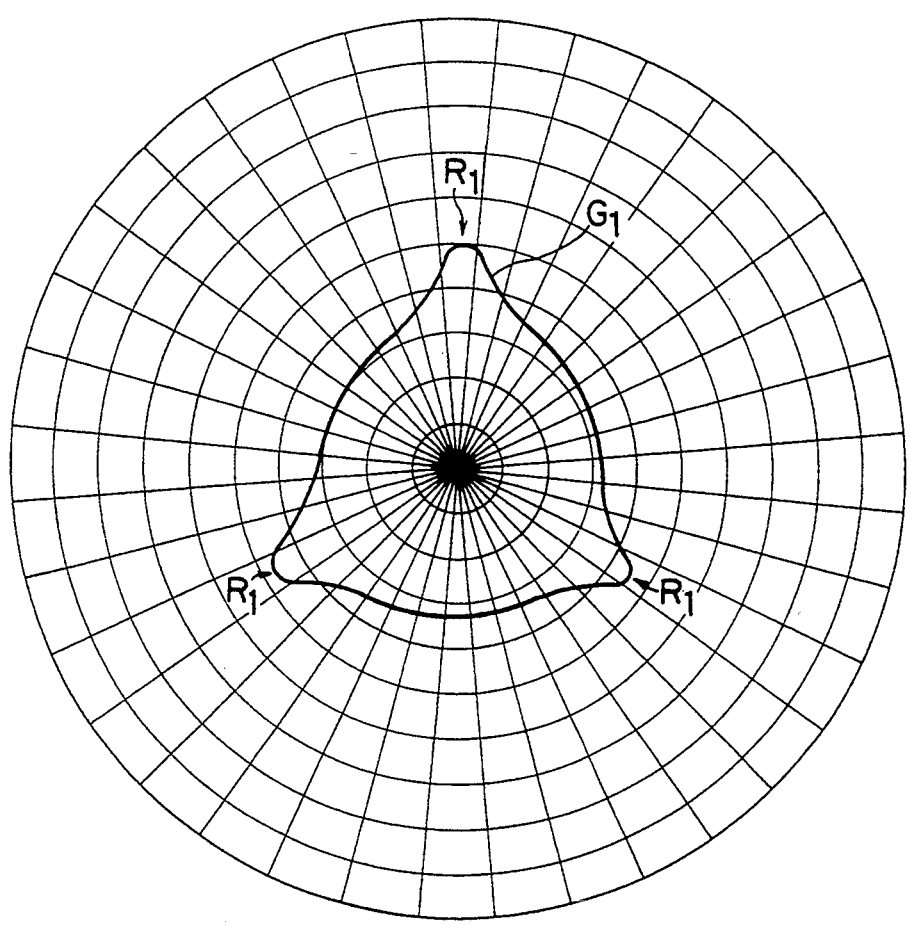
FIG. 15 is a diagram showing the bulge and deformation characteristic of a shaft member.

FIG. 15 shows the bulging deformation characteristic (curve $G_1$) exaggerated in the radial direction of the shaft member 25 at the cam piece installation position after the tube expanding tool J has been inserted under pressure into the hollow portion 24 in this manner. In the curve $G_1$, the three portions $R_1$ where the bulging deformation is the largest are the portions where the shaft member 25 were engaged with three pins 35.

Figure 16:
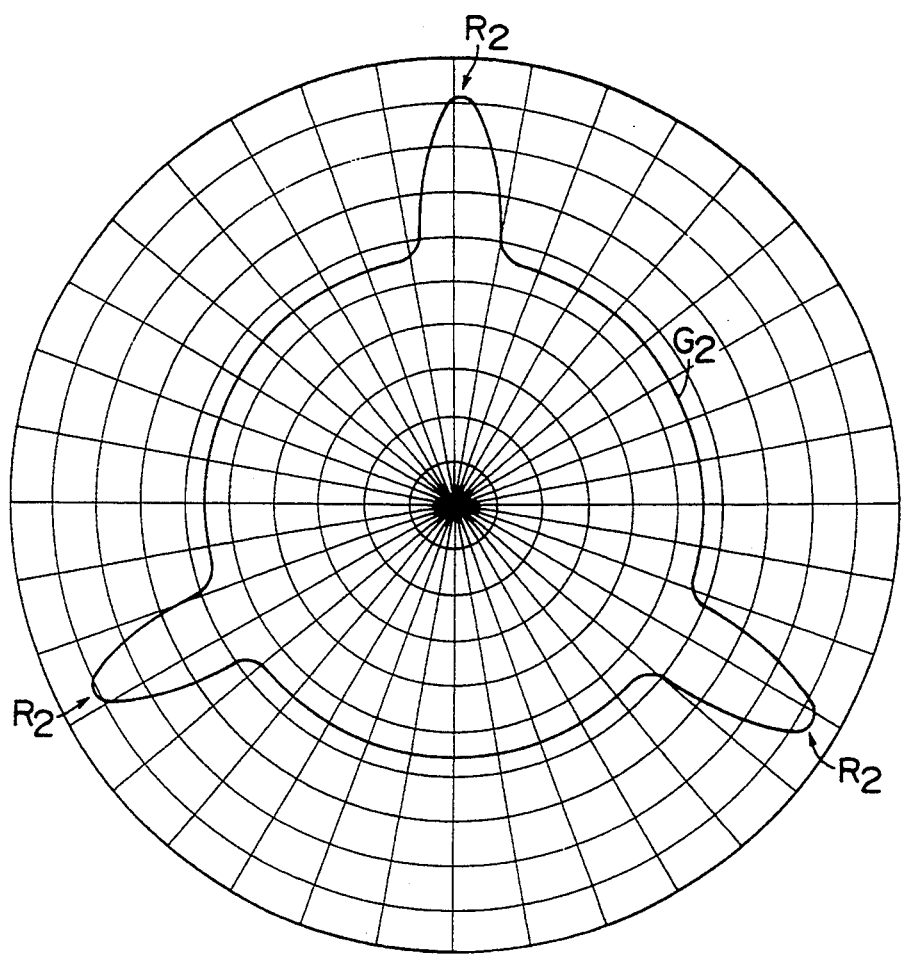
FIG. 16 is a diagram showing the bulge and deformation characteristic of the inner peripheral surface of a cam piece.

Furthermore, FIG. 16 shows the inner circumferential shape (curve $G_2$) exaggerated in the radial direction of the shaft hole 29 of the cam piece 26 before the insertion under pressure of the tube expanding tool J. In the curve $G_2$, three valley portions $R_2$ designate grooves 30.

As described hereinabove, since the pins 35 of the tube expanding tool J and the grooves 30 of the cam piece 26 are in the corresponding positional relationship with respect to the circumferential direction, the bulging portions $R_1$ of the shaft member 25 are fitted or forced into the valley portions $R_2$ (grooves 30) of the shaft hole 29 of the cam piece 26, and when fitted in or forced in, the wall portions around the valley portions $R_2$ of the cam piece 26 are subjected to the plastic deformation by the bulging portions $R_1$ of the shaft member 25, and thereby the shaft member 25 and the cam piece 26 are firmly bonded together. Therefore, the durability of the cam shaft C is increased to a great extent.

In Step #5, the tube expanding tool J is pulled out from the hollow portion 24 of the shaft member 25.

Subsequently in Step #6, the support tool S is partially dismantled to take out the cam shaft C. In this case, only by removing the tightening screws 9 tightening both half-plates 1a, 1b of the base plate 1 and the tightening screws 9 tightening both half-plates 2a, 2b of respective upper plates 2, the support tool S is divided into two parts so that the cam shaft C can be taken out.

In Step #7, a predetermined after-processing is conducted onto the cam shaft C.

Figure 13:
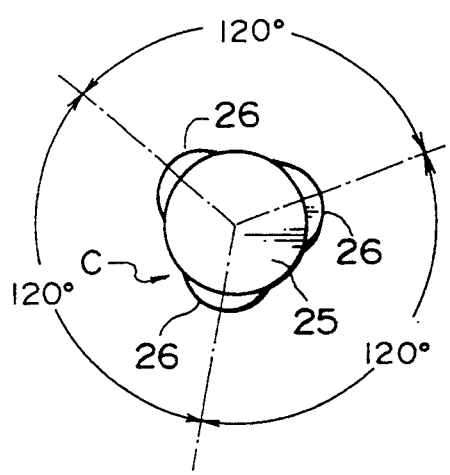
FIG. 13 is a drawing showing the orientations of the cam noses of cam pieces in the cam shaft shown in FIG. 12.
Figure 14:
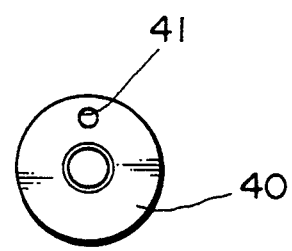
FIG. 14 is a drawing as viewed from the tip end of the cam shaft shown in FIG. 12.

As shown in FIGS. 12 to 14, on the predetermined portions of the shaft member 25 constituting the cam shaft C, a plurality of journal portions 37 are formed by grinding the outer surface of the shaft member 25 to some extent (for example, 0.5 mm). Namely, in the present embodiment, since journal portions 37 are formed by grinding the shaft member 25 without separately forming the journal portions, the number of parts involved can be reduced and the manufacturing cost of the cam shaft C can be reduced. Furthermore, since the diameter of the shaft member 25 can be made larger as compared with the case of separately forming journal portions and jointing them to the shaft member, the rigidity of the cam shaft C can be increased.

On the cam shaft C, an end plate 38, bearing portions 39 and a sprocket installing portion 40 are further installed, and thus, the cam shaft C is completed. The sprocket installing portion 40 is fixed to the cam shaft main body with a fixing pin 41.

The durability test results for the cam shaft manufactured by the method according to the first embodiment and that manufactured by the conventional method will be described below.

Figure 17:
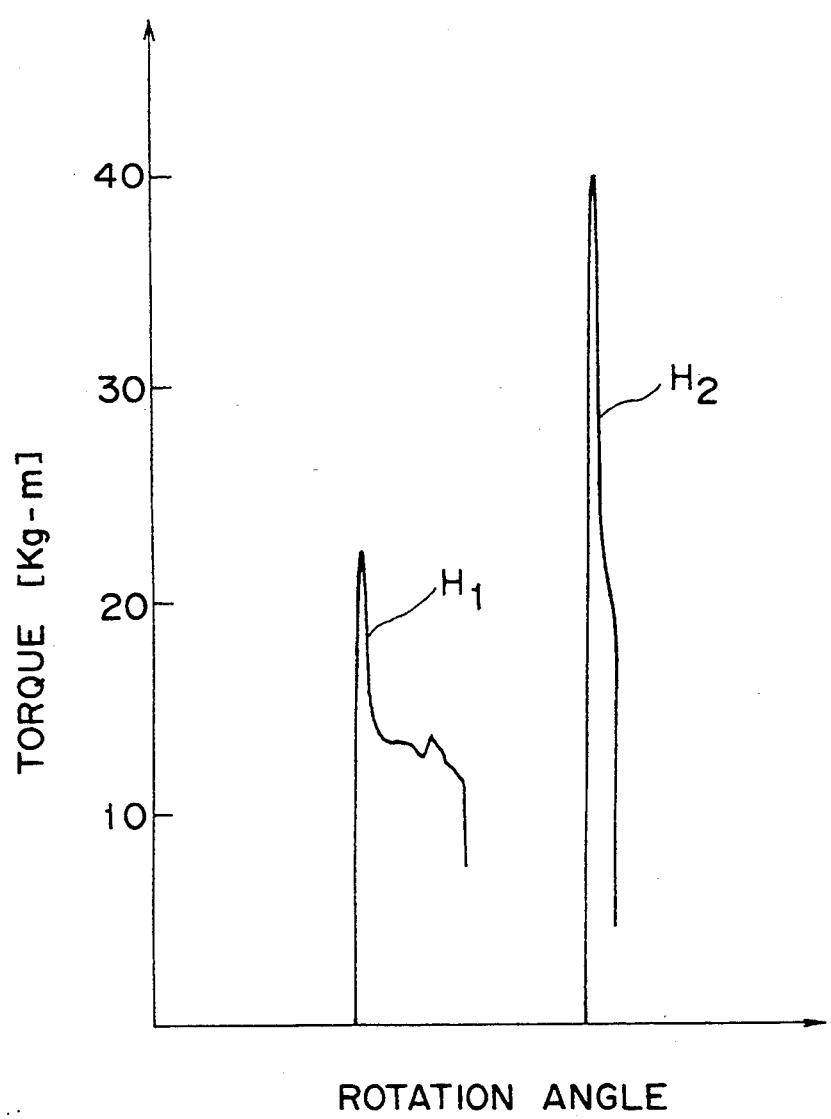
FIG. 17 is a diagram showing the relationship between the torque and the rotation angle of a cam piece when the torque in the circumferential direction of a cam shaft is applied to the cam piece in the conventional cam shaft.

FIG. 17 is a diagram showing the relationship between the torque and the rotation angle of the cam piece when torque is applied on a cam piece in the circumferential direction of the cam shaft manufactured by using a common cam piece provided with no groove on the inner circumferential surface of the shaft hole and a common tube expanding tool, namely, a tool not installed with such pins 35 as employed in the tube expanding tool J in the first embodiment. In FIG. 17, the curve $H_1$ is a test result when the diameter of the tube expanding tool was set to be 0.3 mm larger than the inner diameter of the hollow portion of the shaft member, and the curve $H_2$ is a test result when the diameter of the tube expanding tool was set to be 0.5 mm larger than the inner diameter of the hollow portion of the shaft member.

As is known from FIG. 17, in the curve $H_1$, the deviation of the cam piece in the circumferential direction of the shaft, that is, the cam shaft failure takes place at a torque of about 22 kg-m, while in the curve $H_2$, the deviation in the circumferential direction of the cam piece takes place at a torque of about 39 kg-m.

Figure 18:
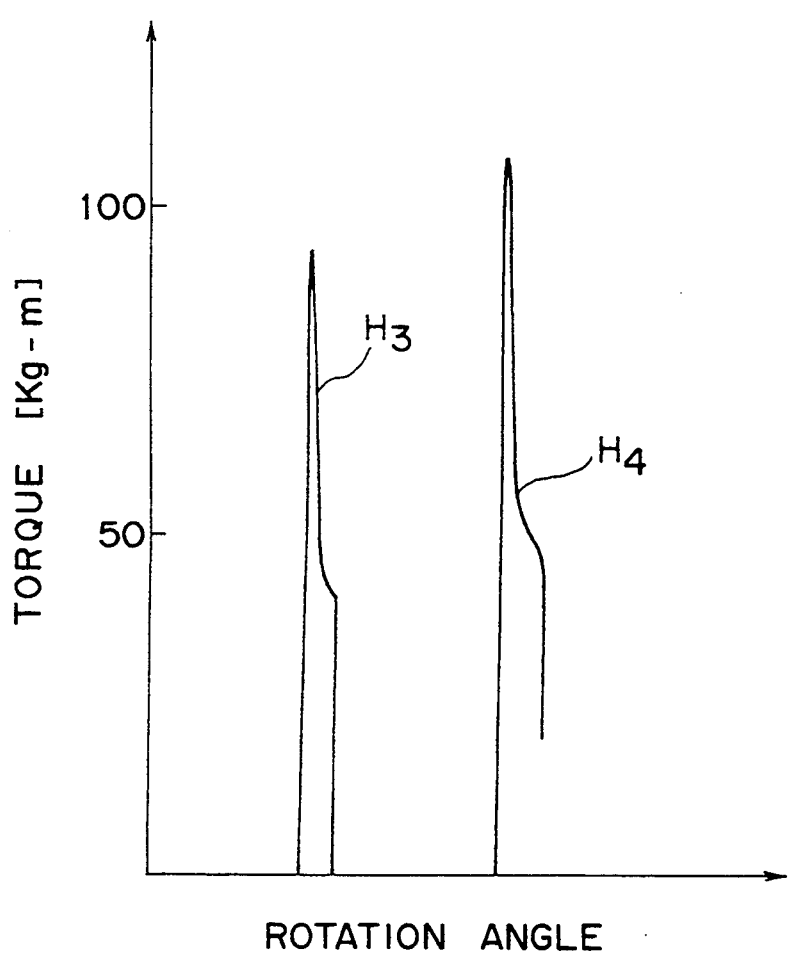
FIG. 18 is a diagram showing the relationship between the torque and the rotation angle of a cam piece when the torque in the circumferential direction of a cam shaft is applied to the cam piece in the cam shaft manufactured by the manufacturing method according to the first embodiment.

FIG. 18 is a diagram showing the relationship between the torque and the rotation angle of the cam piece when a torque is applied to the cam piece 26 in the circumferential direction of the shaft member 25 with respect to a cam shaft C manufacture by the manufacturing method according to the first embodiment. Here, the projecting amount in the radial direction of the pin 35 from the main body of the tube expanding portion 33 is set at 0.3 mm. In FIG. 18, the pressing force of the tube expanding tool J was 1800 kg in curve $H_3$, and 1900 kg in curve $H_4$.

As is apparent from FIG. 18, in curves $H_3$, and $H_4$, the circumferential deviations of the cam piece 26 relative to the shaft take place at the torques of about 94 kg-m, and about 107 kg-m, respectively, In other words, as compared with the curve $H_1$ of FIG. 17 wherein a conventional tube expanding tool merely having a diameter 0.3 mm larger than the hollow portion is employed, about four to five times durability can be obtained.

Figure 19:
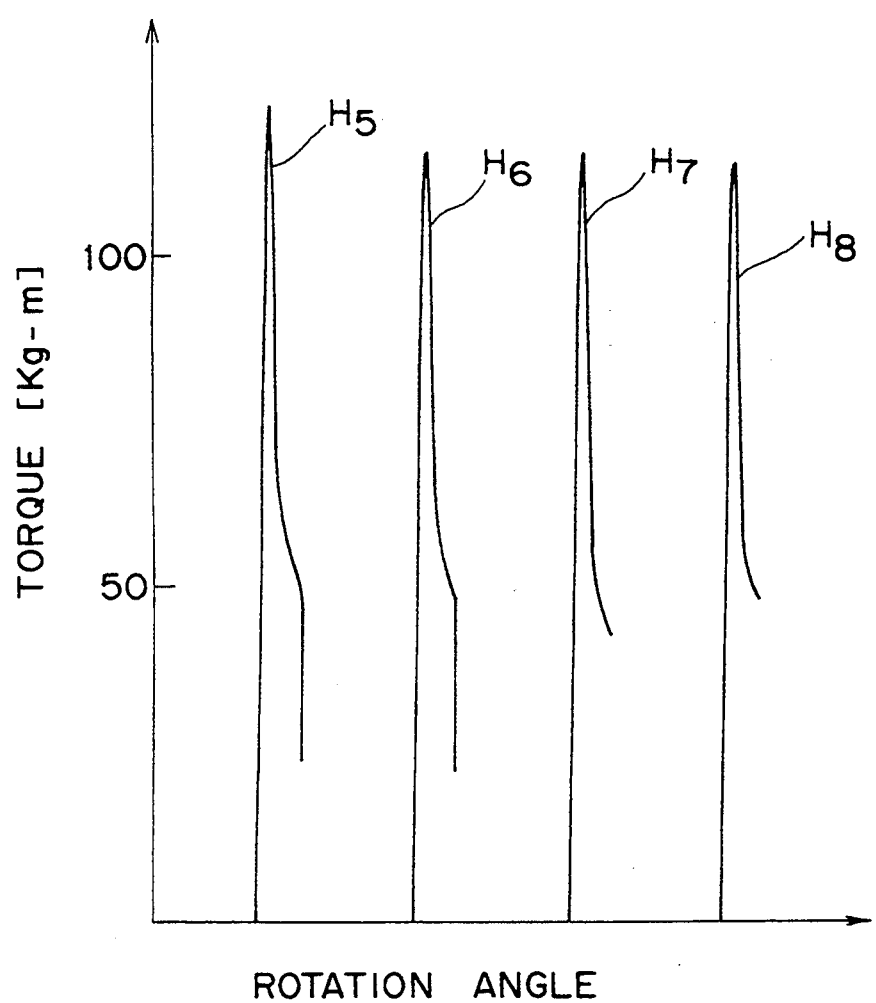
FIG. 19 is a diagram showing the relationship between the torque and the rotation angle of a cam piece when the torque in the circumferential direction of a cam shaft is applied to the cam piece in the cam shaft manufactured by the manufacturing method according to the first embodiment.

FIG. 19 is also a diagram showing the relationship between the torque and the rotation angle of the cam piece when the torque is applied to the cam piece 26 in the circumferential direction of the shaft member 25 with respect to a cam shaft C manufactured by the manufacturing method according to the first embodiment, and the radial projecting amount of the pin 35 from the tube expanding portion main body is set at 0.5 mm. In FIG. 19, the pressing force of the tube expanding tool J was set at 4700 kg in curves $H_5$ and $H_6$, and set at 4800 kg in curves $H_7$ and $H_8$.

AS is apparent from FIG. 19, in curves $H_5$ to $H_8$, the circumferential deviations of the cam piece 26 relative to the shaft take place respectively at about 123 kg-m, 116 kg-m, 116 kg-m and 114 kg-m. In other words, as compared with the case of curve $H_2$ of FIG. 17 wherein a conventional tube expanding tool having a diameter 0.5 mm larger than the hollow portion is employed, approximately three times durability can be obtained.

As described above, by the manufacturing method according to the present invention, the shaft member 25 and the cam pieces 26 can be firmly bonded together and the durability of the cam shaft c can be increased to a great extent.

<The second embodiment>

Hereinbelow, the second embodiment of the present invention will be described, but the basic portion thereof being common to the first embodiment, only the points different from the first embodiment will be described to avoid the duplication The outline of the points different from the first embodiment is as follows.

1) The journal portions are formed by outwardly fitting and bonding the journal pieces provided with shaft holes onto the shaft member.

2) The bulging portions engaging with the groove portions of the cam pieces and journal pieces are formed on the outer circumferential surface of the shaft member.

3) The tube expanding portion of the tube expanding tool is constructed by a single spherical member.

Figure 20:
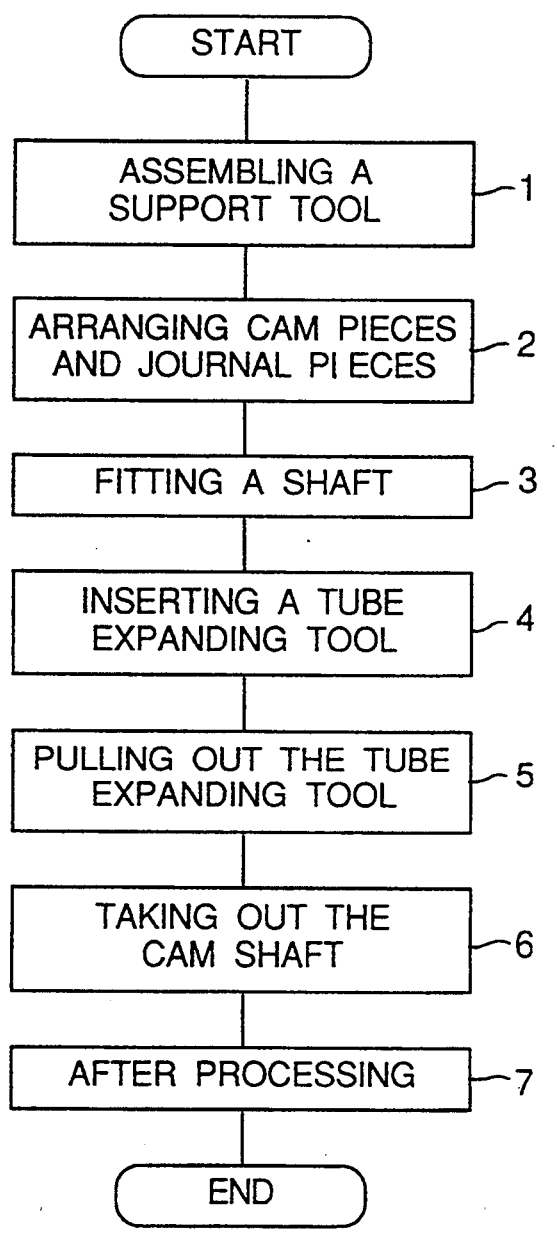
FIG. 20 is a flow chart showing a cam shaft manufacturing method according to the second embodiment.

Although the manufacture of a cam shaft in the second embodiment is conducted in accordance with the flow chart shown in FIG. 20, the flow chart shown in FIG. 20 is basically the same as the flow chart shown in FIG. 1 only except for Step #2 wherein in addition to cam pieces, journal pieces are also arranged on the support tool S'.

In Step #1, the support tool S' is assembled as in the first embodiment.

Figure 21A:
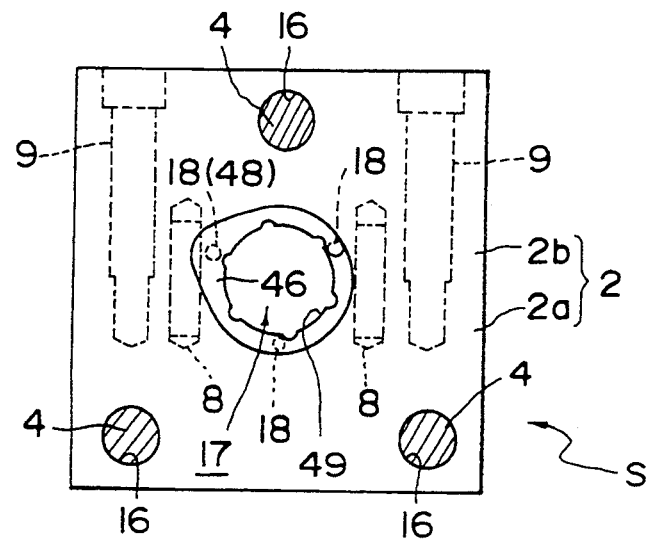
FIGS. 21(a) and 21(b) are respectively explanatory plan and elevation views of a support tool according to the second embodiment.
Figure 21B:
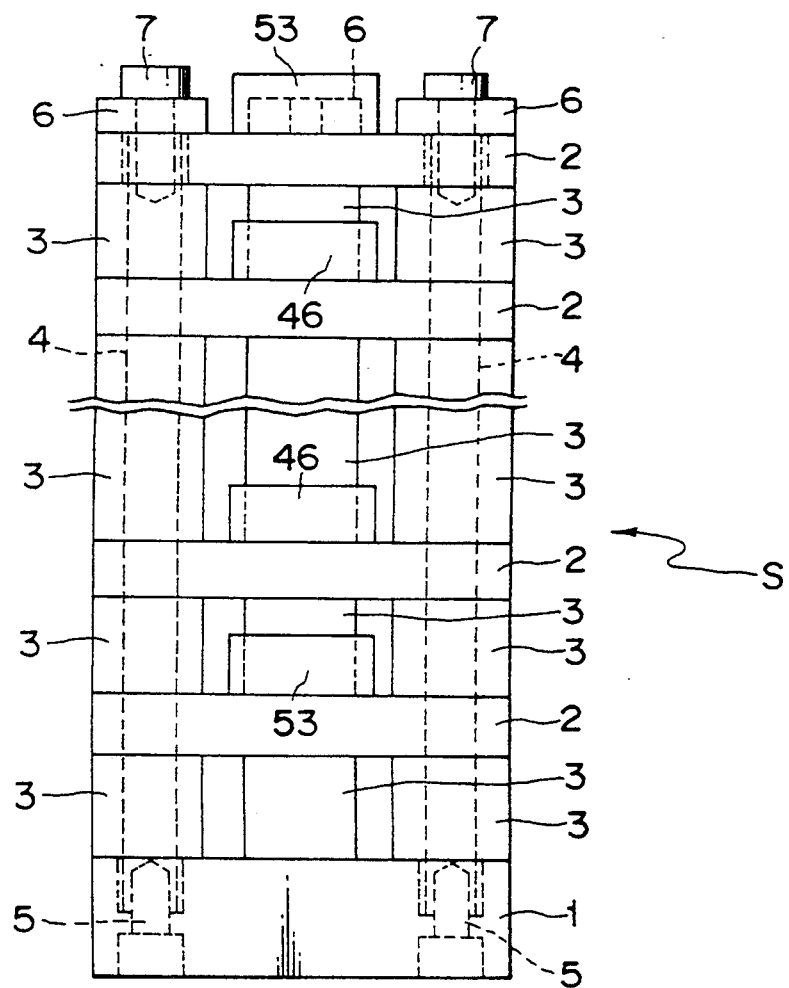

In Step #2, as shown in FIGS. 21(a) and 21(b), on the predetermined positions on the upper surfaces of respective upper plates 2, cam pieces 46 and journal pieces 53 are respectively arranged. Concretely, on the support tool S', there are provided ten upper plates 2, and on the first, fourth, seventh and tenth upper plates 2 counted from above, journal pieces 53 are arranged and cam pieces 46 are arranged on the second, third, fifth, sixth,eighth and ninth upper plates 2.

Figure 22A:
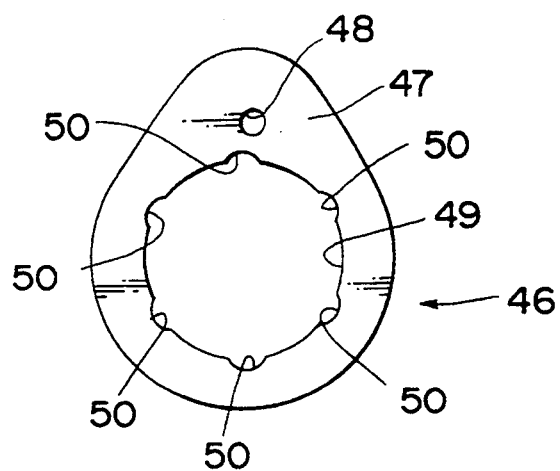
FIG. 22(a) is a drawing of a cam piece as viewed from the axial direction.
Figure 22B:
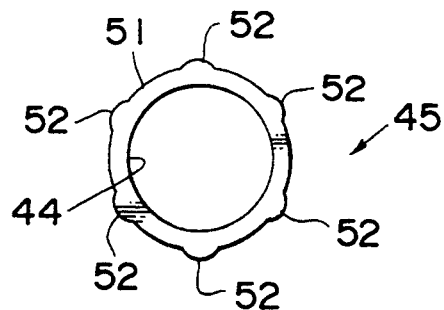
FIG. 22(b) is a drawing of a shaft member as viewed from the axial direction and FIG. 22(c) is a drawing of a journal piece as viewed from the axial direction.

As shown in FIG. 22(a), on the nose portion 47 of the cam piece 46, a pin accommodating hole 48 for accommodating a positioning pin (not shown) is provided. Furthermore, on the cam piece 46, there is provided a shaft hole 49 of an approximately circular shape piercing therethrough in the thickness direction, which is set at a dimension just allowing the shaft member 45 to pass therethrough as shown in FIG. 22(b). On the inner circumferential surface of the cam piece 46, that is, on the circumferential surface of the shaft hole 49, there are formed six grooves 50 extending in the axial direction of the shaft hole 49 (in the thickness direction of the cam piece 46). One of these grooves 50 is arranged at a position corresponding to the most projecting portion of the cam nose portion 47 (in the vicinity of the pin hole 48) viewed in the circumferential direction of the shaft hole 49. And these six grooves 50 are arranged at the positions 60° arc angle apart from each other. Here, the cross-sectional shape of each groove 50 is set to be approximately of an arc, with its depth being set at about 0.3 mm.

It is to be noted here that the number and arrangement positions of these grooves 50 are not limited to the above-described but of course, various settings may be allowable.

When cam pieces 46 are arranged on the upper surfaces of upper plates 2, before arranging cam pieces 46, a positioning pin(not shown) is inserted into one predetermined hole of three pin holes 18. In the second embodiment, positioning pins are inserted into the pin holes 18 arranged on the same positions viewed in the circumferential direction of the circular hole 17 on the second and third upper plates 2 viewed downward from above, and into the pin holes 18 arranged at the positions 120° arc angle apart from the first pin insertion position in the circumferential direction of the circular hole 17 on the fifth and sixth upper plates 2, and into the pin holes 18 arranged at the positions 120° arc angle apart from the second pin insertion positions viewed in the circumferential direction of the circular hole 17 on the eighth and ninth upper plates 2.

With pin accommodating holes 48 being outwardly fitted onto said positioning pins and with shaft holes 49 being overlapped by circular holes 17, cam pieces 47 are arranged on the corresponding upper plates 2.

Figure 22C:
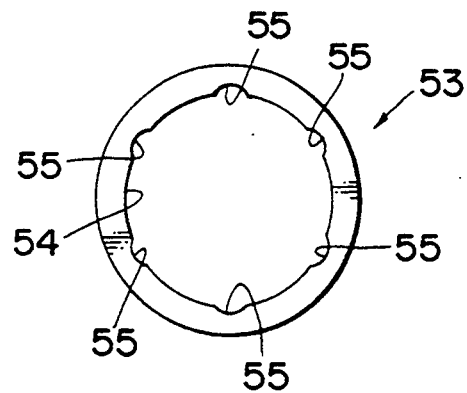

As shown in FIG. 22(c), journal pieces 53 are formed with the same ferrous material as cam pieces 46 and on these journal pieces 53, there are provided shaft holes 54 piercing there through in the thickness direction. The shaft hole 54 is formed in the same shape as the shaft hole 49 of the cam piece 46, and on the inner circumferential surface thereof, there are formed six grooves 55 extending in the axial direction of the shaft hole 54 (in the thickness direction of the journal piece 53). Of course, the shapes and the arrangement positions of these grooves 55 are the same as those of the grooves 50 of the cam piece 46. Furthermore, since the journal piece 53 requires no directionality, the positioning pin is not employed, and arranged on the upper plate 2 so that the shaft hole 54 is overlapped approximately on the circular hole 17.

FIGS. 21(a) and 21(b) show the state wherein cam pieces 46 and journal pieces 53 are respectively arranged on the corresponding upper plates 2 in this manner.

Figure 23:
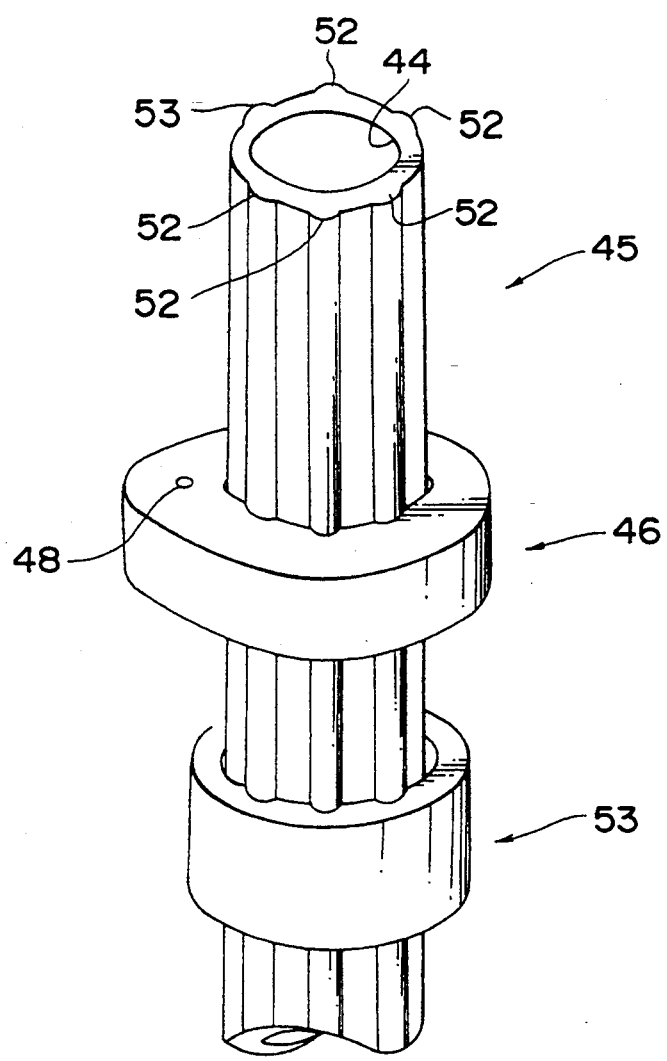
FIG. 23 is an explanatory perspective view of a shaft member accompanied by a cam piece and a journal piece.

In Step #3, a shaft member 45 having a hollow portion 44 as shown in FIG. 23 is fitted onto the shaft holes 49, 54 of the cam pieces 46 and journal pieces 53 arranged respectively on the corresponding upper plates 2 and the circular holes 17 of the upper plates 2.

As shown in FIGS. 22(b) and 23, on the outer circumferential surface of the shaft member 45, six bulged portions 52 extending in the axial direction thereof are formed, which are arranged at the positions 60° arc angle apart from each other in the circumferential direction of the shaft member 45. Here, the cross-sectional shape of each bulged portion 52 is rendered to be approximately of an arc shape so that it may be engaged with the grooves 50, 55, with the depth thereof being set at about 0.2 mm so as to be a little smaller than those of the grooves 50, 55.

As described above, since each cam piece 46 is positioned by the positioning pin, when the shaft member 45 is fitted onto the shaft holes 49, 54 and the circular holes 17, each cam piece 46 is spontaneously arranged correctly at the predetermined position with respect to the circumferential direction thereof. Therefore, the positioning of each cam piece 46 becomes very easy, and the positional accuracy is increased. Furthermore, since a pin accommodating hole 48 is formed on the cam piece 46 the weight thereof is reduced by that portion, resulting in the weight reduction of the cam shaft C'.

In Step #4, a tube expanding tool is pressed into the hollow portion of the shaft member 45 so as to bulge and deform (plastic deformation) the shaft member 45 outward in the radial direction.

Figure 24:
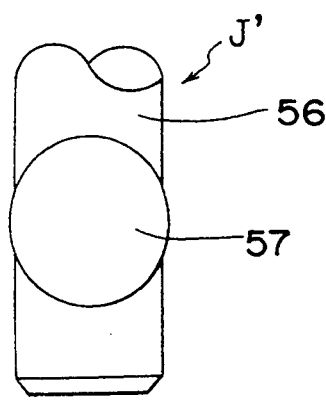
FIG. 24 is a schematic view of the tip end vicinity of a tube expanding tool.

As shown in FIG. 24, the tube expanding tool J' is substantially constituted by an axis portion 56 of approximately circular shape and a spherical tube expanding portion 57 having a diameter a little large (for example, 0.5 to 1.0 mm larger) than the diameter of said axis portion 56. Here, the diameter of the tube expanding portion 57 is set to be a little larger than the diameter of the hollow portion 44 of the shaft member 45, and when the tube expanding tool J' is inserted under pressure into the hollow portion 44, the shaft member 45 is bulged and deformed outward in the radial direction by the tube expanding portion 57. The tube expanding portion 57 is formed by a ferrous material (for example, S55C) having a predetermined hardness (for example, more than HRC 50).

Figure 25A:
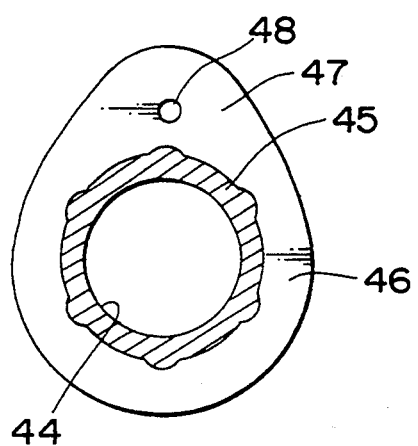
FIG. 25(a) is a drawing showing the bonded state between a shaft member and a cam piece.
Figure 25B:
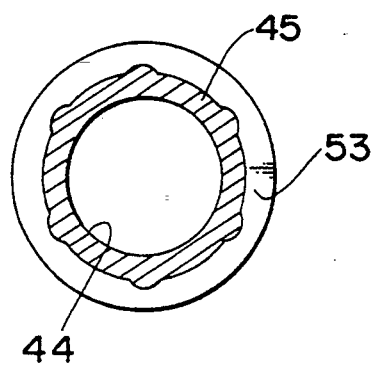
FIG. 25(b) is a drawing showing the bonded state between a shaft member and a journal piece.

The tube expanding tool J' is inserted into the hollow portion 44 of the shaft member 45 by a predetermined pressing force (for example, 3 to 4.5 tons) by using a press apparatus (not shown), etc. Thereby, as shown in FIGS. 25(a) and 25(b), the shaft member 45 is bulged and deformed outward in the radial direction by the tube expanding tool J' (tube expanding portion 57), so that the outer circumferential surface of the shaft member 45 is press-bonded to the inner circumferential surface of the cam piece 46 and the inner circumferential surface of the journal piece 53 so as for the shaft member 45 to be firmly bonded with respective cam pieces 46 and journal pieces 53.

At this time, since the bulged portions 52 of the shaft member 45 are engaged with the grooves 50 of the cam pieces 46 and the grooves 55 of the journal pieces 53, the bonding force between the shaft member 45 and the cam pieces 46 and the journal pieces 53 are sufficiently elevated, and the durability of the cam shaft C' is enhanced to a great extent.

In Step #5, the tube expanding tool J' is pulled out from the hollow portion 44 of the shaft member 45.

Subsequently, in Step #6, the support tool S' is partially dismantled to take out the cam shaft C'.

In Step #7, a predetermined after-processing is conducted onto the cam shaft C'.

Figure 26:
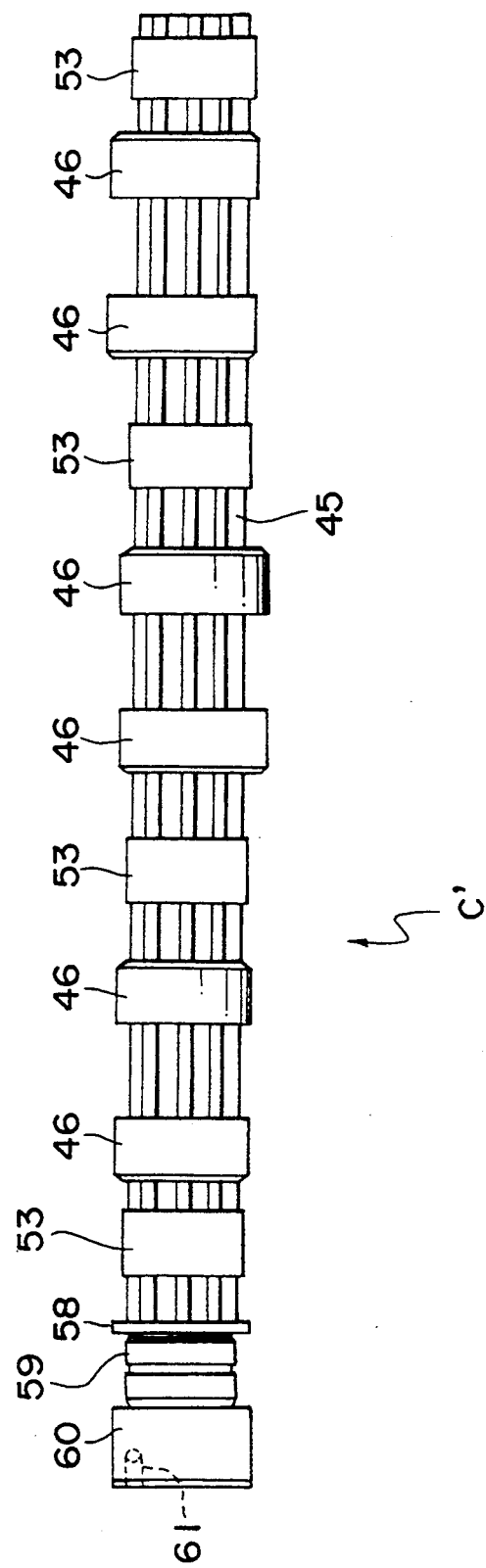
FIG. 26 is an explanatory side view of a cam shaft according to the second embodiment.

More specifically, as shown in FIG. 26, an end plate 58, bearing portions 59 and a sprocket installation portion 60 are installed on the cam shaft C', and thus, the cam shaft C' is completed. The sprocket installation portion 60 is fastened to the main body of the cam shaft C' with a fixing pin 61.

Table 1 shows the torques, at which the circumferential deviations of a cam piece 46 take place; i.e. the intensity of connection of the cam shaft C' in the circumferential direction, when torque is applied to the cam piece 46 in the circumferential direction of the shaft member 45 with respect to the cam shaft C' manufactured by the method according to the second embodiment.

TABLE 1

| Intensity of connection of the cam shaft in the circumferential direction | |
|---|---|
| | Torque |
| No. 1 | 112 kg-m |
| No. 2 | 88 kg-m |
| No. 3 | 100 kg-m |
| No. 4 | 110 kg-m |
| No. 5 | 95 kg-m |
| Average | 101 kg-m |

Here,
the thickness of the cam piece is 14 mm,
the quality of the cam piece is S50C,
the number of grooves of the cam piece is 12,
the outer diameter of the shaft member is 32.4 mm,
the inner diameter of the shaft member is 24 mm,
the quality of the shaft member is STKM 17C-S-C,
the number of bulged portions of the shaft member is 12,
and the outer diameter of the expanding tool is 24.8 mm.

Table 2 shows the forces, at which the deviations of a cam piece 46 in the axial direction take place; i.e. the intensity of connection of the cam shaft C' in the axial direction, when force is applied to the cam piece 46 in the axial direction of the shaft member 45 with respect to the cam shaft C' manufactured by the method according to the second embodiment.

TABLE 2

| Intensity of connection of the cam shaft in the axial direction | |
|---|---|
| | Force |
| No. 1 | 3.1 ton |
| No. 2 | 3.5 ton |
| No. 3 | 4.3 ton |
| No. 4 | 4.0 ton |
| No. 5 | 3.5 ton |
| Average | 3.7 ton |

Here,
the thickness of the cam piece is 14 mm,
the quality of the cam piece is S50C,
the number of grooves of the cam piece is 12,
the outer diameter of the shaft member is 32.4 mm,
the inner diameter of the shaft member is 24 mm,
the quality of the shaft member is STKM 17C-S-C,
the number of bulged portions of the shaft member is 12,
and the outer diameter of the expanding tool is 24.8 mm.

In this manner, by the second embodiment also, the shaft member 45, cam pieces 46 and journal pieces 53 can be firmly bonded, and the durability of the cam shaft C' is elevated to a great extent. Furthermore, the positioning of cam pieces 46 becomes very easy.

What is claimed is:

1. A method of manufacturing a cam shaft comprising the steps of:
    preparing a plurality of cam pieces each having a shaft hole extending therethrough in a thickness direction and a positioning pin hole for accommodating a positioning pin, defined therein;
    preparing a tubular shaft member having a hollow portion defined therein;
    forming a plurality of grooves extending in an axial direction of said shaft hole at predetermined positions on an inner circumferential surface of said shaft hole of said each cam piece;
    preparing a support tool, in which a plurality of upper plates, each having a circular hole having a diameter larger than a largest diametral length of said shaft member and pin holes capable of engaging with said positioning pins being located around said circular hole, are arranged at predetermined spacings in the vertical direction;
    inserting said positioning pin into a predetermined one of said pin holes of said each upper plate;
    arranging said cam pieces on the corresponding upper plates of said support tool so that said positioning pin holes are outwardly fitted onto the corresponding positioning pins;
    fitting said shaft member onto said shaft holes and said circular holes so that said cam pieces are spontaneously arranged on predetermined positions with respect to a circumferential direction thereof; and thereafter inserting under pressure a tube expanding tool provided with bulged portions corresponding to said grooves into said hollow portion of said shaft member to bulge and deform said shaft member in a radial direction so that said grooves and said bulged portions confront each other, thereby bonding said cam pieces and said shaft member together.

2. A method of manufacturing a cam shaft comprising the steps of:

preparing a plurality of cam pieces each having a shaft hole extending therethrough in a thickness direction and a positioning pin hole for accommodating a positioning pin, defined therein;

preparing a tubular shaft member having a hollow portion defined therein;

forming a plurality of grooves extending in an axial direction of said shaft hole at predetermined positions on an inner circumferential surface of said shaft hole of said each cam piece, and providing bulged portions of a shape capable of engaging with said grooves extending in an axial direction of said shaft member on an outer circumferential surface of said shaft member;

preparing a support tool, in which a plurality of upper plates, each having a circular hole having a diameter larger than a largest diametral length of said shaft member and pin holes capable of engaging with said positioning pins being located around said circular hole, are arranged at predetermined spacings in the vertical direction;

inserting said positioning pin into a predetermined one of said pin holes of said each upper plate;

arranging said cam pieces on the corresponding upper plates of said support tool so that said positioning pin holes are outwardly fitted onto the corresponding positioning pins;

fitting said shaft member onto said shaft holes and said circular holes so that said grooves and said bulged portions are engaged with each other, whereby said cam pieces are spontaneously arranged on predetermined positions with respect to a circumferential direction thereof; and bulging and deforming said shaft member in a radial direction by inserting under pressure a tube expanding tool provided with a tube expanding portion having a diameter larger than that of said hollow portion into said hollow portion of said shaft member, thereby bonding said cam pieces and said shaft member together.

3. A support tool for cam pieces for manufacturing a cam shaft which is manufactured by bulging and deforming a shaft member in a radial direction after fitting said shaft member onto shaft holes of cam pieces, said support tool comprising:

a plurality of upper plates each having a circular hole having a diameter larger than a largest diametral length of said shaft member and pin holes located around said circular hole, said upper plates being arranged at predetermined spacings in the vertical direction by means of connecting rods;

said pin holes being capable of engaging with positioning pins capable of engaging with positioning pin holes provided on said cam pieces; and a predetermined one of said pin holes of said each upper plate being capable of engaging with said positioning pin hole of said cam piece arranged thereon by means of said positioning pin, so that said cam pieces on said upper plates are spontaneously arranged on predetermined positions with respect to a circumferential direction thereof when said shaft member is fitted onto said shaft holes and said circular holes.

* * * * *